US006721069B1

(12) United States Patent
Harrington (10) Patent No.: US 6,721,069 B1
(45) Date of Patent: Apr. 13, 2004

(54) MAPPING FROM FULL COLOR TO HIGHLIGHT COLOR AND TEXTURE

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/432,058

(22) Filed: Oct. 28, 1999

(51) Int. Cl.$^7$ .................................................. G09G 3/36
(52) U.S. Cl. ........................................ 358/3.2; 358/3.09
(58) Field of Search .................. 358/1.9, 2.1, 3.06–3.2, 358/515–523, 534–536

(56) References Cited

U.S. PATENT DOCUMENTS

| | | | |
|---|---|---|---|
| 4,903,048 A | 2/1990 | Harrington | 346/157 |
| 5,153,576 A | 10/1992 | Harrington | 340/793 |
| 5,237,517 A | 8/1993 | Harrington et al. | 384/526 |
| 6,252,580 B1 * | 6/2001 | Harrington | 345/582 |

* cited by examiner

Primary Examiner—Thomas D. Lee
Assistant Examiner—Stephen Brinich (74) Attorney, Agent, or Firm—Fay, Sharpe, Fagan, Minnich & McKee, LLP (57) ABSTRACT

A method of color image processing for mapping an input image from a full color gamut to a textured highlight color gamut includes defining an input color in a desired three dimensional color space by determining intensity values for a first color coordinate, a second color coordinate, and a third color coordinate. A halftone cell is partitioned into first and second regions such that the first region contains first pixels, and the second region contains second pixels. Based on the intensity values, a first number of first pixels are selected for rendering in a highlight color. The first number of first pixels are selected from all the first pixels in a first sequential order. Again based on the intensity values, a second number of first pixels are selected for rendering in a base color. This time the second number of first pixels are selected from all the first pixels in a second sequential order. Preferably, the second sequential order is opposite the first sequential order. Based on the intensity values, a first number of second pixels are selected for rendering in the highlight color with the first number of second pixels being selected from all the second pixels in a third sequential order. Also based on the intensity values, a second number of second pixels are selected for rendering in the base color, and the second number of second pixels are selected from all the second pixels in a fourth sequential order. Preferably, the fourth sequential order is opposite the third sequential order.

21 Claims, 5 Drawing Sheets

MAPPING FROM FULL COLOR TO HIGHLIGHT COLOR AND TEXTURE

BACKGROUND OF THE INVENTION

The present invention relates to the art of image processing. It finds particular application in conjunction with mapping full color images to textured highlight color images, and, more particularly, to retaining luminance, saturation, and hue information from full color images in the reduced color gamut of a highlight color scheme with the use of textured patterns. While described with reference to particular image reading and rendering engines (e.g., digital copiers and/or printers, video monitors, highlight color printers, laser and/or ink jet color printers, data reading and/or storage devices, scanners, etc.) it is to be appreciated that the present invention is also amenable to other like applications.

Color images have become a significant element in the printing industry and are used regularly in video presentations, hard copy reports, and otherwise. As a result, color image processing tools including reading and rendering engines with color processing capabilities are in demand and have been developed to obtain color images. Much of the color rendering is performed using a full color gamut which includes tints and shades of the full color spectrum, e.g. reds, greens, blues and their combinations. The gamut of colors in a full color image can be described as a three-dimensional (3D) volume which is represented by the double hexagonal cone 10 illustrated in FIG. 1. In the cone 10, luminance varies from dark to light as one moves upward along a vertical axis 12, saturation varies from unsaturated grays to fully saturated colors as one moves radially outward from the vertical axis 12, and hue varies as one moves angularly about the vertical axis 12.

Nevertheless, a significant amount of color rendering can be adequately performed using a highlight color scheme. The use of highlight color rendering over full color rendering is attractive for a number of reason. For example, it is advantageous to use a highlight color printer because it is generally faster and less expensive than a full color printer since only two inks are put down as opposed to the three or four inks which must be used in order to obtain full color images. However, in the highlight color scheme, a restricted gamut of colors is available to the rendering engine. As pointed out for example, in highlight color printing, only two inks are used in the printing process. These inks typically comprise a base color (i.e., black or white) and a highlight color (e.g., red, blue, green, or other non-grayscale color). The restricted gamut can be represented by the two-dimensional (2D) triangle 14 illustrated in FIG. 2. The triangle 14 is a vertical slice from the full color cone 10 in FIG. 1 taken along the axis 12 and extending radially outward therefrom at the angle corresponding to the hue of the highlight color.

Color image processing and/or rendering that involves mapping from a 3D color gamut to a restricted gamut has been addressed in commonly owned U.S. Pat. Nos. 4,903, 048 and 5,153,576 to Harrington, and commonly owned U.S. Pat. No. 5,237,517 to Harrington, et al., all incorporated herein by reference. U.S. Pat. No. 5,153,576 is concerned with mapping color images to black-and-white using textured patterns in such a manner that the various colors in a 3D color space are mapped to distinct textures. U.S. Pat. Nos. 4,903,048 and 5,237,517 are concerned with color image processing including mapping from a full color gamut to a highlight color gamut, and rendering of images in a highlight color gamut.

Referring again to FIGS. 1 and 2, rendering a full color image on a highlight color rendering engine involves mapping coordinates from the 3D double hexagonal cone 10 into the 2D triangle 14. Accordingly, the rendering engine is called upon to reproduce as closely as possible the full color image with the reduced color gamut available to it while minimizing the loss of information (e.g., luminance, saturation, and/or hue) contained in the original full color image. In previously developed mapping techniques, typically many different colors (defined by their coordinates in the full color space) are mapped to the same location in the highlight color space. This results in the loss of important hue information when mapping the full color image to the highlight color scheme. That is to say, with some prior developed mapping techniques, different colors (e.g., yellow and magenta) which have the same luminance and same saturation level of highlight color (e.g., red) are indistinguishable when mapped to the highlight color gamut.

The loss of hue information is particularly disadvantageous in the case of functional or presentation graphics. Color images associated with presentation graphics, use color differently from pictorial images. In presentation graphics, the colors chosen are often bright and highly saturated for maximum visual impact. Specific items or images in presentation graphics (e.g., bars on a graph, slices of a pie chart, etc.) tend to be differentiated primarily by hue. Consequently, important information lies in the hue.

Accordingly, the present invention contemplates a new and improved mapping technique which overcomes the above-referenced problems and others.

SUMMARY OF THE INVENTION

In accordance with one aspect of the present invention, a method of color image processing for mapping an input image from a full color gamut to a textured highlight color gamut is provided. The method includes defining an input color in a desired three dimensional color space by determining intensity values for a first color coordinate, a second color coordinate, and a third color coordinate. A halftone cell is partitioned into first and second regions. The first region contains first pixels, and the second region contains second pixels. Based on the intensity values, a first number of first pixels are selected for rendering in a highlight color. The first number of first pixels are selected from all the first pixels in a first sequential order. Again based on the intensity values, a second number of first pixels are selected for rendering in a base color. This time the second number of first pixels are selected from all the first pixels in a second sequential order. Based on the intensity values, a first number of second pixels are selected for rendering in the highlight color with the first number of second pixels being selected from all the second pixels in a third sequential order. Also based on the intensity values, a second number of second pixels are selected for rendering in the base color, and the second number of second pixels are selected from all the second pixels in a fourth sequential order.

In accordance with another aspect of the present invention, a color image processing system includes an image input terminal which reads an input image represented in a fill color gamut, and an image output terminal which renders the input image in a textured highlight color gamut. Also included is an image processing unit which samples colors from the input image and maps the sampled colors to textured highlight color patterns.

One advantage of the present invention is that it retains hue information from an original full color image when mapping the full color image to a highlight color image by using textured patterns in the highlight color image to represent different hues from the full color image.

Another advantage of the present invention is that the relative luminance and saturation properties are retained in mapping from full color images to textured highlight color images.

One other advantage of the present invention is that its a high quality, fast, and cost efficient technique for rendering full color images with a rendering engine having a restricted gamut of colors available thereto.

Yet another advantage of the present invention is that it provides for an arbitrary selection of the hue used for the highlight color.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not be construed as limiting the invention.

DETAILED DESCRIPTION OF THE PREFERRED EMBODIMENTS

Figure 1:
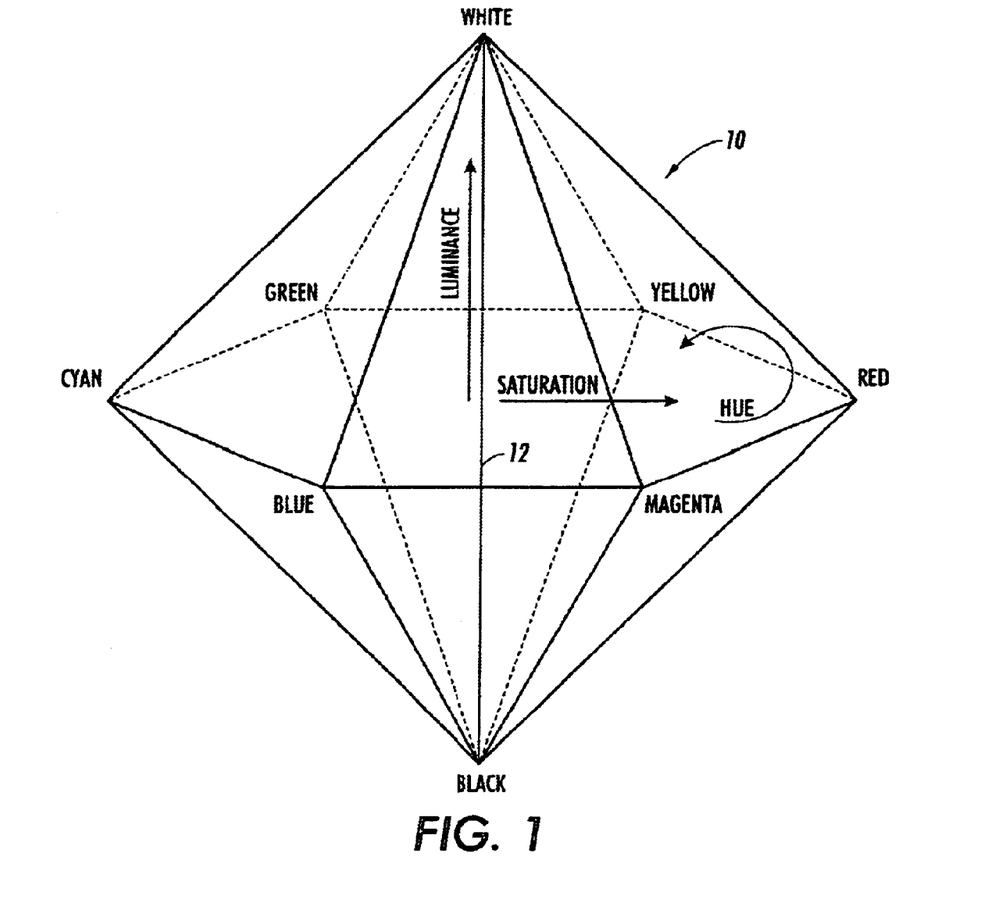
FIG. 1 is a diagrammatic illustration portraying a 3D full color space.
Figure 2:
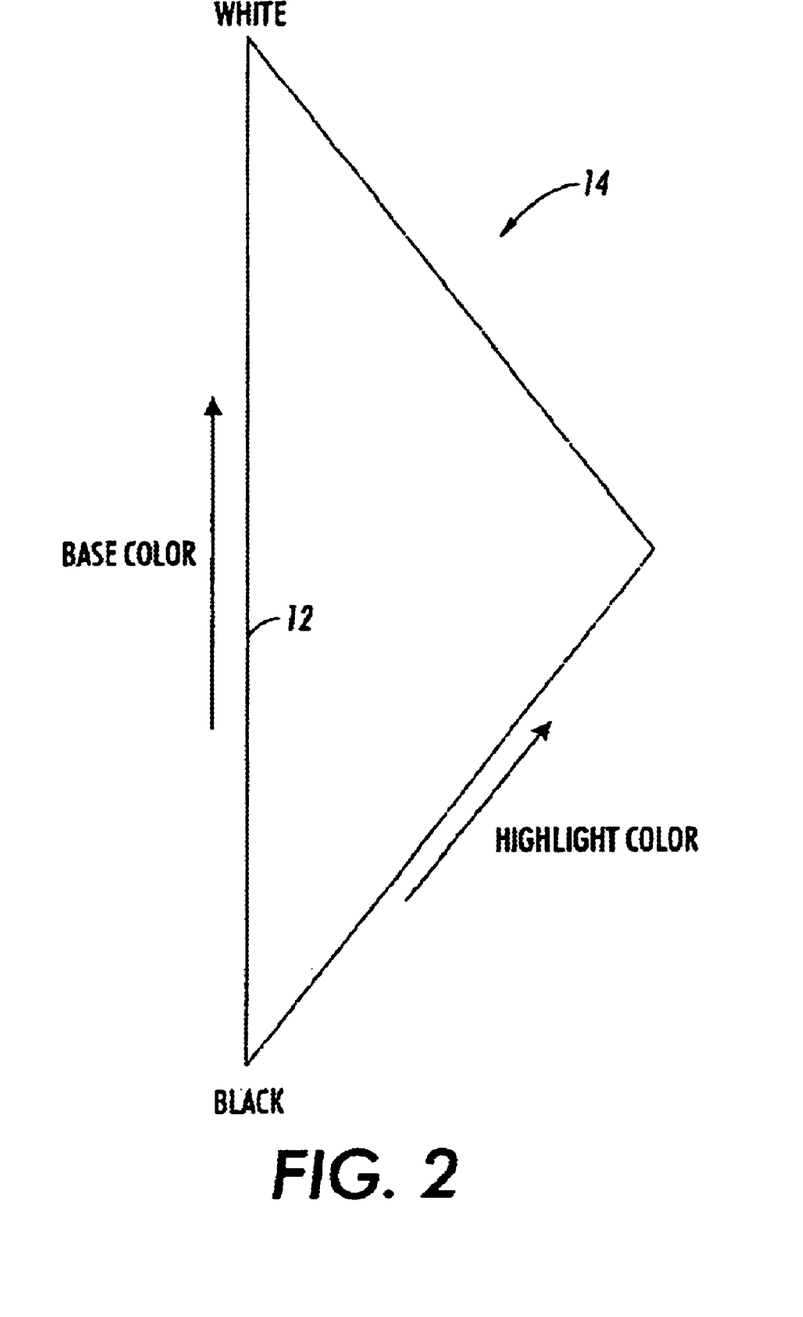
FIG. 2 is a diagrammatic illustration portraying a 2D highlight color space.
Figure 3:
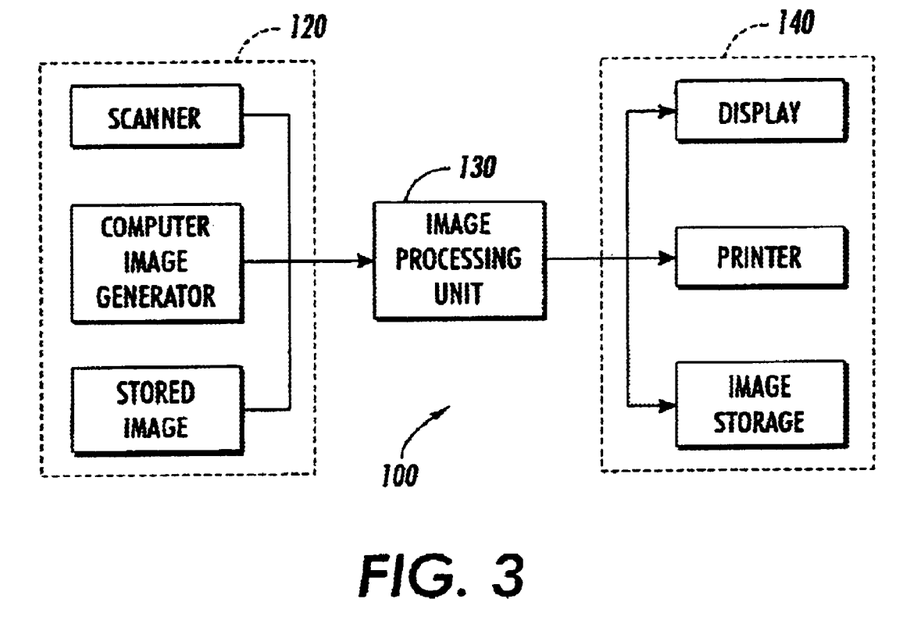
FIG. 3 is a diagrammatic illustration portraying an image processing system in accordance with aspects of the present invention.

With reference to FIG. 3, an image processing system 100 employs an image input terminal 120 to read or otherwise receive an input image portrayed in a full color coordinate system of a 3D color space, e.g., as shown in FIG. 1. The image input terminal 120 optionally includes one or more suitable color image input devices such as an electronically or otherwise stored image reader, a computer image generator, a scanner, or the like. In an exemplary embodiment used herein for purposes of illustrating the present invention, incoming or sampled colors from the input full color image are defined in a red-green-blue (RGB) color coordinate system. Alternately, other input color coordinate systems are optionally employed, e.g., cyan-yellow-magenta (CYM), Lab, etc.

An image processing unit 130 receives the input full color image from the image input terminal 120. The image processing unit 130 carries out mapping operations which convert the full color image to a textured highlight color image while retaining the luminance properties, saturation properties, and hue information present in the original full color image. An image output terminal 140 receives the image from the image processing unit 130 and stores or renders the image in the textured highlight color scheme. The textured highlight color image is representative of the original input full color image and it retains the luminance, saturation, and hue information present in the input color image. Optionally, the image output terminal 140 includes one or more appropriate rendering engines such as an image storage device, a digital printer, a video display monitor, or the like. In a preferred embodiment, the image output terminal 140 includes is a highlight color rendering engine which renders images with two color separations including a selected highlight color (preferably, a primary color or other non-grayscale color) and base color (preferably, black or white).

In a preferred embodiment, the mapping carried out by the image processing unit 130 is described in terms of a color coordinate system (u, v, w) where (1, 0, 0) represents the arbitrarily selected highlight color, (1, 1, 1) represents white and (0, 0, 0) represents black. While a particular base color is selected for illustrative purposes herein, preferably, in actual use the base color is alternately white or black with the other being assigned to the opposing coordinates in the (u, v, w,) color space. By imposing this transformation, the sampled colors are expressed in a way that allows the same expressions to be used for mapping to amounts of highlight and base color regardless of the highlight color chosen for the system. In any event, a sampled color from the input image is defined in the 3D (u, v, w) color space by determining the intensity values for the first (u), second (v), and third (w) color coordinates of the sampled color in that color space. The image processing unit 130 first converts incoming color coordinates from the input color coordinate system to the (u, v, w) color coordinate system. The particular transformation depends upon the chosen highlight color. The conversion is preferably carried out by applying a transformation matrix T to the incoming color coordinates as follows:

$$[u,v,w]=[r,g,b]T \qquad (1);$$

wherein r, g, and b represent the intensity values of the incoming color coordinates (assuming, e.g., an RGB color space as the input color space). Accordingly, T is given by:

$$T = \begin{vmatrix} r_h & g_h & b_h \\ g_h - b_h & b_h - r_h & r_h - g_h \\ 1 & 1 & 1 \end{vmatrix}^{-1} \begin{vmatrix} 1 & 0 & 0 \\ 0 & -1 & 1 \\ 1 & 1 & 1 \end{vmatrix} \qquad (2);$$

wherein $r_h$, $g_h$, and $b_h$ represent the color coordinates of the chosen highlight color as defined in the input color coordinate system. In this example, the intensity values for the color coordinates are normalized to range between 0 (representing zero intensity) and 1 (representing full or complete intensity). Alternately, the intensity values are represented by an eight bit value and range from 0 to 255. Using additional bits to represent the intensity values gives a broader range with correspondingly higher resolution in terms of the intensity values for the various color coordinates. Moreover, note that when the chosen highlight color is red, green, or blue, the transformation is optionally replaced with a simple exchange of coordinates. Regardless, in this manner then, the color processing accounts for an arbitrarily chosen highlight color by defining the incoming sampled colors in terms of a 3D color space based upon the chosen highlight color wherein one of the color coordinates represents the amount of highlight color present in the sampled color.

Having established the coordinate location of the incoming or sampled color in the 3D (u, v, w) color space, the image processing unit 130 calculates or otherwise determines (e.g., via look up tables, etc.) the values for four parameters, termed herein, h1, h2, k1, and k2. As more fully described later herein, the four terms are ultimately compared against corresponding thresholds to determine an output textured highlight color for the sampled color. The first listed term, h1, is given by:

$$h1 = \max(0, u-w) \qquad (3);$$

wherein the function max returns a value corresponding to its highest argument value. Consequently, the term h1 is a measure of the amount of highlight color over color w present in the sampled color. The max function with a first argument of zero ensures a non-negative h1 term such that where the amount of highlight color is less than or equal to the amount of w color, the term h1 is made equal to zero.

Similarly, the second listed term, h2, is given by:

$$h2 = \max(0, u-v) \qquad (4).$$

In this case, the term h2 is a non-negative measure of the amount of highlight color over color v present in the sampled color.

Assuming that the range of intensity levels from unsaturated to fully saturated are represented by and/or normalized to a range of values between 0 and 1, respectively, then the third term, k1, is given by:

$$k1 = \max\{0, \min[1-h1, (1-u)(1-v)(1-w)+(w-v)w(1-v)+ n(1-u)vw]\} \qquad (5);$$

wherein the function min returns a value corresponding to its lowest argument value. Accordingly, the min function returns the lower of: (i) the complement of h1 given by the term 1−h1, and (ii) the sum of three terms, i.e., (1−u)(1−v)(1−w), (w−v)w(1−v), and (1−u)vw, each based upon the intensity values for the color coordinates u, v, and w of the sampled color. The ultimate influence of these three terms is discussed later herein. Nevertheless, n is a variable parameter, preferably ranging between 0 and 1, which is used to control the level of influence exerted by the last of the three terms, i.e., (1−u)vw. Again, the max function with a first argument of zero ensures a non-negative result for k1.

Finally, the fourth term, k2, is preferably equivalent to k1 with the roles of or intensity values for color coordinates v and w being interchanged or transposed. Consequently, k2 is preferably given by:

$$k2 = \max\{0, \min[1-h2, (1-u)(1-w)(1-v)+(v-w)v(1-w)+ n(1-u)wv]\} \qquad (6).$$

In transposing the color coordinates v and w, the term 1−h1 is changed to 1−h2 thereby representing the complement of h2. Additionally, only the middle of the three terms in the second argument of the min function is effected by transposing the color coordinates and w.

Figure 4A:
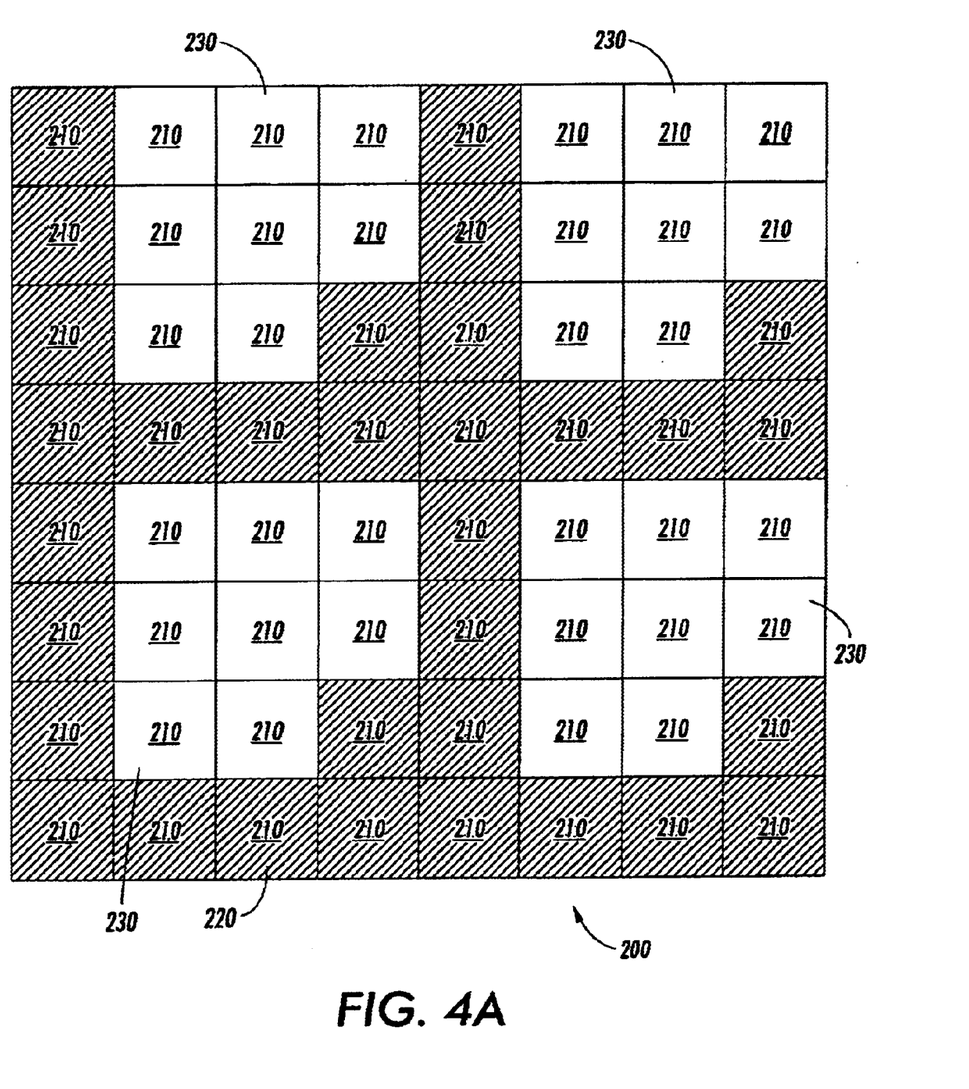
FIG. 4A is a diagrammatic illustration portraying distinct regions of an exemplary divided halftone cell employed in image processing in accordance with aspects of the present invention; and, FIG. 4B is a diagrammatic illustration portraying exemplary threshold levels for pixels in the halftone cell shown in FIG. 4A.
Figure 4B:
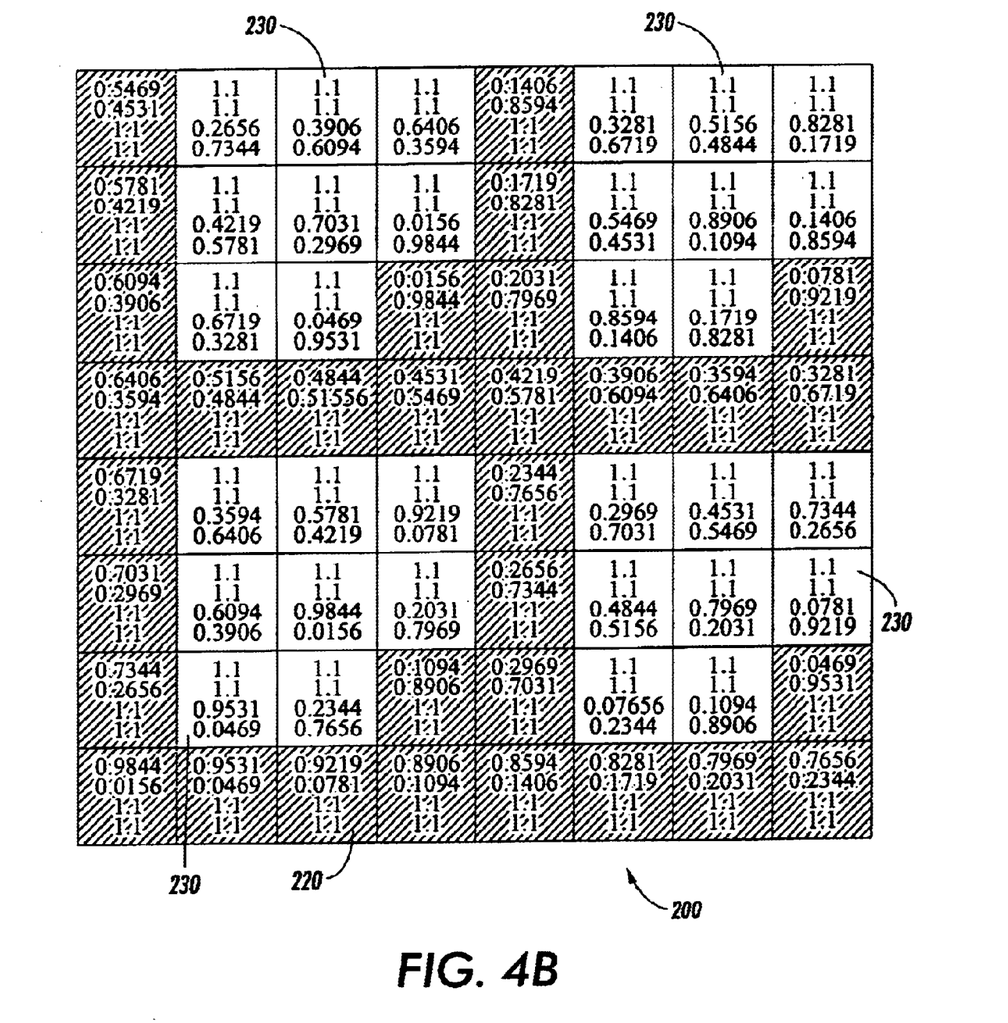

With further reference to FIGS. 4A and 4B, having evaluated or otherwise determined values for the four terms, h1, h2, k1, and k2, they are employed in controlling an image processing halftone cell 200 employed by the image processing unit 130 such that a textured highlight color image is rendered at the image output terminal 140 corresponding to the original input full color image. More specifically, based upon the intensity values for color coordinates u, v, and w of the sampled or incoming color as represented by the terms h1, h2, k1, and k2, the individual pixels 210 within the halftone cell 200 are selected for rendering with either the highlight color or the base color. That is to say, the four terms set forth the relative relationships and values of u, v, and w upon which the decisions are made as to the output state of each pixel 210 within the halftone cell 200. The individual output state for each pixel 210 is selected as either highlight color on, base color on, or both colors off In this manner, sampled colors are mapped to particular highlight colors with luminance and saturation properties of the sampled color being retained and the hue of the sampled color being encoded within the produced textured patterns.

The textured patterns arise or are produced by dividing the halftone cell 200 into, preferably, two separate and distinct regions, nominally termed herein the first region 220 (i.e., the shaded pixels in FIG. 4A) and the second region 230 (i.e., the non-shaded pixels in FIG. 4A). The regions are alternately continuous or discontinuous regions of optional shapes and sizes as desired. Preferably, the ratio of areas or sizes of the first and second regions 220 and 230 are proportional to or reflect the luminance ratio for the color coordinates v and w. In this manner, the luminance properties or behavior from the input image is retained or more closely approximated at rendering.

Each region contains a distinct set of pixels. For example, the first region 220 contains first pixels and the second region 230 contains second pixels wherein the set of pixels defined by the first pixels does not overlap the set of pixels defined by the second pixels. In a preferred embodiment, the regions are distinct insomuch as the pixels 210 in each region are either controlled by terms h1 and k1 or in the alternative by terms h2 and k2.

More specifically, in a preferred embodiment, the output state selected for a particular pixel 210 in the halftone cell 200 is determined by whether or not the evaluated terms h1, k1, h2, and k2 for the sampled color meet or bypass respective threshold levels set for that particular pixel 210 (as best seen in FIG. 4B, exemplary threshold levels are listed in each pixel from top to bottom in order as follows: h1, k1, h2, and k2). For example, in those pixels 210 where the evaluated terms h1 or h2 are greater than the respective threshold levels set for h1 or h2, the pixel's output state is highlight color on, and in those pixels 210 where the evaluated terms k1 or k2 are greater than the respective threshold levels set for k1 or k2, the pixel's output state is base color (e.g., black) on. Otherwise, in those pixels 210 where none of the four evaluated terms are greater than their respective threshold levels, the pixel's output state is off or uncolored.

Within this framework, it is now more convenient to elaborate on the influence of the three terms in the second argument of the min function of terms k1 and k2. In particular, the first term (1−u)(1−v)(1−w) is a pseudo-measurement of sampled color luminance insomuch as it tends to supply at rendering a greater number of pixels 210 with black (i.e., base color) outputs when the sampled or incoming color is darker. The middle term (w−v)w(1−v) for k1 or (v−w)v(1−w) for k2 reflects intensity value differences between the color coordinates v and w. More specifically, regarding k1, the middle term tends to supply at rendering a number of pixels with black outputs based upon the amount by which the intensity value for the color coordinate w exceed that for the color coordinate v weighted by the intensity values of the w color coordinate over the v color coordinate. Regarding k2, the middle term tends to supply at rendering a number of pixels with black outputs based upon the amount by which the intensity value for the color coordinate v exceed that for the color coordinate w weighted by the intensity values of the v color coordinate over the w color coordinate. Finally, the last term (1−u)vw tends to supply at rendering some pixels with black outputs when there is a low amount of highlight color in the sampled color and color coordinates v and w are balanced, thereby providing some shading at rendering for this case. The amount of shading is controlled by the variable parameter n.

Returning attention to FIGS. 4A and 4B, in the exemplary embodiment illustrated, each pixel 210 has a full complement of thresholds set for each of the four evaluated terms. In this case, the halftone cell 200 is divided by setting the threshold levels for the two non-controlling terms in each of the first and second regions 220 and 230 beyond the reach of their respective evaluated terms. For example, the thresholds for non-controlling terms are optionally set to 1.1 which is greater than 1 which is the maximum potential value for the evaluated terms. Therefore, the output states of pixels 210 in their respective regions of the halftone cell 200 are determined regardless of the values for the non-controlling evaluated terms because the values for the non-controlling evaluated terms will never reach the set threshold levels.

Alternately, division is achieved by assigning to the pixels 210 in the respective regions a single given pair of thresholds corresponding to a single pair of evaluated terms, i.e., either h1 and k1 or h2 and k2. In this manner, for example, pixels 210 in the first region 220 only have threshold levels set for the evaluated terms h1 and k1, and only h1 and k1 are compared to their respective thresholds to determine the output states for the pixels 210 in the first region 220. Likewise, pixels 210 in the second region 230 only have threshold levels set for the evaluated terms h2 and k2, and only h2 and k2 are compared to their respective thresholds to determine the output states for the pixels 210 in the second region 230.

Regardless of how division of the halftone cell 200 is accomplished, in the region controlled by evaluated terms h1 and k1, the threshold levels for the terms h1 and k1 are preferably set so that pixels having progressively lower h1 thresholds have progressively higher k1 thresholds and vice-versa. Likewise, in the region controlled by evaluated terms h2 and k2, the threshold levels for the terms h2 and k2 are preferably set so that pixels having progressively lower h2 thresholds have progressively higher k2 thresholds and vice-versa. Consequently, in each region, for any given set of evaluated terms h1, k1, h2, and k2, the number of pixels selected for rendering in the highlight color and the number of pixels selected for rendering in the base color are selected from all the pixels in the particular region in opposing sequential orders. As such, overlap (i.e., the same pixel 210 having more than one of its thresholds met or bypassed) is minimized, and by avoiding overlap to the extent possible, the amount of information retained in the mapping is maximized.

The invention has been described With reference to the preferred embodiments. Nevertheless, obviously, modifications and alterations will occur to others upon reading and understanding the preceding detailed description. For example the threshold levels, the relationships between color coordinate u, v, and w, the terms h1, k1, h2, and k2, the relative sizes and shapes of the halftone cell regions, the choice of highlight color, the choice of base color, etc. are all optionally adjusted or modified to achieve the textured highlight color patterns desired for particular applications. It is intended that the invention be construed as including all such modifications and alterations insofar as they come within the scope of the appended claims or the equivalents thereof.

Having thus described the preferred embodiments, the invention is now claimed to be:

1. A method of color image processing for mapping an input image from a full color gamut to a textured highlight color gamut, said method comprising the steps of:

(a) defining an input color in a desired three dimensional color space by determining intensity values for a first color coordinate, a second color coordinate, and a third color coordinate;

(b) partitioning a halftone cell into first and second regions, said first region containing first pixels and said second region containing second pixels;

(c) based on the intensity values, selecting a first number of first pixels for rendering in a highlight color, said first number of first pixels being selected from all the first pixels in a first sequential order;

(d) based on the intensity values, selecting a second number of first pixels for rendering in a base color, said second number of first pixels being selected from all the first pixels in a second sequential order;

(e) based on the intensity values, selecting a first number of second pixels for rendering in the highlight color, said first number of second pixels being selected from all the second pixels in a third sequential order; and, (f) based on the intensity values, selecting a second number of second pixels for rendering in the base color, said second number of second pixels being selected from all the second pixels in a fourth sequential order.

2. The method according to claim 1, wherein the first and second regions are distinct non-overlapping regions that cover the halftone cell.

3. The method according to claim 1, wherein the second sequential order is opposite the first sequential order.

4. The method according to claim 1, wherein the fourth sequential order is opposite the third sequential order.

5. The method according to claim 1, wherein the intensity value for the first color coordinate represents an amount of highlight color present in the input color.

6. The method according to claim 5, wherein in step (c) the first number of first pixels selected is based upon an amount by which the intensity value for the first color coordinate is greater than the intensity value for the third color coordinate.

7. The method according to claim 5, wherein in step (e) the first number of second pixels selected is based upon an amount by which the intensity value for the first color coordinate is greater than the intensity value for the second color coordinate.

8. The method according to claim 5, wherein in step (d) the second number for first pixels selected is based upon a first fixed relationship between the intensity values for the first, second, and third color coordinates.

9. The method according to claim 8, wherein in step (f) the second number of second pixels selected is based upon a second fixed relationship between the intensity values for the first, second, and third color coordinates, said second fixed relationship being equivalent to the first fix relationship with the intensity values for the second and third color coordinates being transposed.

10. The method according to claim 8, wherein, when the intensity values are normalized so that they range on a scale from 0 representing completely unsaturated to 1 representing fully saturated, the first fixed relationship is given by a term k1 such that:

$$k1=\max\{0,\min[1-\max(0,u-w),(1-u)(1-v)(1-w)+(w-v)w(1-v)+n(1-u)vw]\}$$

where u represents the intensity value for the first color coordinate; v represents the intensity value for the second color coordinate; w represent the intensity value for the third color coordinate; n is a variable parameter which controls an amount of influence of its associated term (1−u)vw; max is a function which returns a value corresponding to its highest argument value; and, min is a function which returns a value corresponding to its lowest argument value.

11. The method according to claim 5, wherein a size of the first region relative to the second region is proportional to a luminance of the second color coordinate relative to the third color coordinate.

12. The method according to claim 1, said method further comprising:

sampling the input color from the input image in an alternate three dimensional color space; and, applying a transform to the sampled input color to define the input color in the desired three dimensional color space.

13. The method according to claim 12, wherein the desired three-dimensional color space is based upon the highlight color.

14. The method according to claim 13, wherein the transform applied depends upon coordinates of the highlight color in the alternate three-dimensional color space.

15. The method according to claim 14, wherein the desired three-dimensional color space is such that regardless of highlight color selection an amount of highlight color rendered reflects an amount of highlight color in the sampled input color.

16. The method according to claim 1, wherein the base color is selected from a group consisting of black and white.

17. A color image processing system, said color image processing system comprising:

an image input terminal which reads an input image represented in a full color gamut;

an image output terminal which renders the input image in a textured highlight color gamut; and, an image processing unit which samples colors from the input image and maps the sampled colors to textured highlight color patterns, wherein said image processing unit employs a divided halftone cell to map the sampled colors to the textured highlight color patterns, said divided halftone cell comprising:

a first region encompassing a first set of pixels, wherein output states for said first set of pixels are controlled in response to values for first and second terms determined based upon intensity values of color coordinates defining the sampled colors; and, a second region which does not overlap the first region, said second region encompassing a second set of pixels, wherein output states for said second set of pixels are controlled in response to values for third and fourth terms determined based upon intensity values of color coordinates defining the sampled colors.

18. The color image processing system according to claim 17, wherein there are three color coordinates defining the sampled colors, and one of the three color coordinates represents an amount of highlight color present in the sampled colors.

19. The color image processing system according to claim 18, wherein when two color coordinates defining the sampled colors are transposed the first term is substantially the same as the third term and the second term is substantially the same as the fourth terms, said two color coordinates both being other than that one which represents an amount of highlight color present in the sampled colors.

20. The color image processing system according to claim 19, wherein each pixel in the first set of pixel has a first and second threshold level corresponding to the first and second terms, respectively, such that the output state of each pixel in the first set of pixels is determined in response to the values for the first and second terms relative to the first and second threshold levels therefor; and, wherein each pixel in the second set of pixel has a third and fourth threshold level corresponding to the third and fourth terms, respectively, such that the output state of each pixel in the second set of pixels is determined in response to the values for the third and fourth terms relative to the third and fourth threshold levels therefor.

21. The color image processing system according to claim 20, wherein pixels in the first set of pixels having progressively higher first threshold levels have progressively lower second threshold levels, and pixels in the second set of pixels having progressively higher third threshold levels have progressively lower fourth threshold levels.

* * * * *